United States Patent Office 3,018,282
Patented Jan. 23, 1962

---

3,018,282
PRODUCTION OF LIQUID FATTY ACID ESTERS OF SUCROSE ADDITION COMPOUNDS
Samuel B. Crecelius, St. Paul, Minn., assignor to Economics Laboratory, Inc., St. Paul, Minn., a corporation of Delaware
No Drawing. Filed Mar. 21, 1958, Ser. No. 722,865
5 Claims. (Cl. 260—234)

This invention relates to surface active agents, and has for its object the provision of improved surface active agents and an improved process for forming the agents from sucrose. The invention provides an efficient process for producing the new surface active agents from relatively cheap and available materials. The process can be carried out easily and simply with water as a solvent thus avoiding the use of the expensive solvents in the processes heretofore proposed for forming surfactants from sugar.

In accordance with the process of the invention, sucrose is reacted with an aliphatic epoxide having from 3 to 18 carbon atoms, advantageously butylene oxide, octylene oxide, propylene oxide, and dodecylene oxide, and the resulting addition compound is reacted with a fatty acid chloride having from 8 to 18 carbon atoms, such as lauric acid or refined tall oil, to form a fatty acid ester of the sucrose addition compound.

Sucrose is a disaccharide sugar described in the literature as having the following structure:

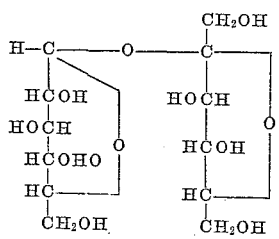

It is commonly known as cane or beet sugar and is available almost universally in a chemically pure state.

The epoxides, butylene oxide and propylene oxide, are presently preferred because of their availability and uniformity and the invention will be described with deference to their use, it being understood that the other epoxides may be used in a similar manner. The Dow Chemical Company supplies commercial grades of these epoxides as follows:

BUTYLENE OXIDE S

This product is a mixture of butylene oxide polymers which is soluble in most organic solvents but only slightly soluble in water. It has the following properties: B.P. 60–67° C., mol. wt. 72.1, sp. gr. at 25° C.—0.86, refractive index at 25° C.—1.381, viscosity at 25° C.—0.40 centipoises, and flash point 5° F.

BUTYLENE OXIDE M

This product is a mixture of the isomers 1,2-butylene oxide, cis and trans 2,3-butylene oxide, and isobutylene oxide (about 10%). The remaining properties are not significantly unlike those of Butylene Oxide S. Butylene Oxide M is preferred because of its lower cost.

The propylene oxide which is commercially available from several sources may be used. It is infinitely soluble in most organic solvents, and only slightly soluble in water. One suitable product has the following properties: colorless liquid, B.P. 34.2° C., mol. wt. 58.1, sp. gr. 25° C.—0.826, refractive index at 25° C.—1.363, viscosity at 25° C.—0.28 centipoises and flash point 20° F.

The fatty acid chloride may be the acid chloride of any suitable single aliphatic compound varying from 8 to 18 carbon atoms, such as lauric, oleic or stearic acids, or a mixture of such fatty acids as they exist in a natural state from vegetable or animal fats, or a tall oil which has been refined to reduce the rosin content to less than 1%, such, for instance, as is sold under the tradename of Aliphat 44 by General Mills, or Acintol FA No. 2, sold by Arizona Chemical Company. The fatty acid chlorides may be prepared according to a method described in U.S. Patent 2,077,371 which consists of mixing a fatty acid with phosphorous trichloride in equal portions, allowing the mixture to stand for one hour and then heating it to 100° C. for one hour and allowing it to stand overnight. The by-products of the reaction then settle to the bottom of the container leaving the fatty acid chlorides in a clear layer on top which can be decanted off. The fatty acid chlorides can be prepared by any other acceptable method known to the art.

It is known that epoxide groups will react with hydroxide groups, carbonyl groups and lactone groups all of which are found in sucrose. There is considerable evidence to indicate that the epoxide reacts with the sucrose to form ether linkages and that free hydroxyl groups are present.

The butylene oxide-sucrose addition products are light colored viscose liquids soluble in water, alcohol and benzene. They are stable to heat to about 150° C. at which point they begin to darken and decompose. Various products were prepared using from two to eight mols of butylene oxide per mol of sucrose in water solutions and in the presence of a trace of strong acid catalyst such as sulfuric acid. Increase in the butylene oxide content caused the addition product to be more stable when heated but less soluble in hot water. The product obtained by the reaction of 5.5 mols of butylene oxide with one mol of sucrose was most applicable for preparing the final ester products of the invention. The reaction is exothermic and the reaction mixture will rise to about 70° C. of its own accord. The addition of the butylene oxide takes from 5 to 8 hours. The acidity from the catalyst is then neutralized with a weak solution of KOH. The water is pulled off under vacuum with gentle heating until the remaining product is about 95% solids. This product is used as the intermediate.

The propylene oxide sucrose addition product is prepared in the manner just described, using propylene oxide in place of butylene oxide on an equivalent molar basis. The resulting addition product has properties similar to the products formed with butylene oxide.

The final ester product is prepared by adding the fatty acid chloride directly to the epoxy-sucrose intermediate with agitation at temperature from 40 to 100° C. The addition is carried out over a period of from 30 minutes to two hours. The reaction takes place between the acid chloride group and an hydroxyl group of the intermediate liberating HCl. The HCl formed may be neutralized by adding either a saturated solution of $Na_2CO_3$ or by an amine such as diethanol amine. When sodium carbonate is used the sodium chloride formed is filtered out of the final product. When diethanol amine is used, the amine salt is left in the final product. After all the fatty acid chloride is added, the reaction completed, and the HCl neutralized, the final product is heated to about 140 to 150° C. to drive off any remaining water. The resulting final product is the surface active agent of the invention.

The following examples illustrate the preparation of the reaction product of sucrose and butylene oxide, and the preparation of fatty acid esters from the product of sucrose and butylene oxide.

*Example 1*

The product identified as "A" was prepared as follows: 684 g. of sucrose and 400 g. of water were introduced into a flask equipped with a stirrer and reflux condenser and stirred until the sucrose dissolved into a syrup. Twenty drops of concentrated $H_2SO_4$ were then added and the mixture was stirred. The addition of 800 g. of butylene oxide was then begun slowly. The temperature rose to about 75° C. and the addition of butylene oxide was adjusted so that the temperature remained constant at about this point. The total addition of butylene oxide took about 6 hours. The largest part of the water was then distilled off under vacuum at 80° C. The product was then taken up to about 130° C. while passing through $CO_2$ gas. Less than 5% of water by weight then remains in the final product. The final product "A" was soluble in water, alcohol, and benzene preparation.

85 g. of Aliphat 44 (tall oil) acid chlorides was added slowly with stirring over a 30 minute period to 200 g. of "A" (described above). After all the acid chloride was added, stirring was continued for 1½ hours while blowing with $CO_2$. It was then cut to 75% solids with ethyl alcohol, and a saturated solution of $Na_2CO_3$ was added until the product was neutral. The final solution of the product was then filtered to remove the sodium chloride formed. The alcohol and water were then driven off the product by heating it to 150° C. The characteristics and performance of this product as a surface active agent are shown in Table II.

*Example 2*

200 g. of "A" (prepared as in Example 1) was heated to 50° C. and then 34 g. of coconut fatty acid chlorides was added slowly to the product while stirring over a period of 1½ hours. The temperature was maintained at 50° C. during the entire addition. After the addition of the coconut fatty acid chlorides was completed the reaction mixture was stirred for 30 minutes longer at 45–50° C. and then let stand overnight. The product was then neutralized to pH 7 with a saturated solution of sodium carbonate. The product which was very viscous was cut to 50% solids with alcohol and filtered to remove the salt. The final characteristics and performance of the product are shown in Table II.

*Example 3*

44 g. of Aliphat 44 (tall oil) acid chlorides was added slowly with stirring to 200 g. of "A" (prepared as in Example 1). The temperature was kept at 45° C. during the addition which took 2 hours. After the addition was complete the reaction was stirred about 15 minutes longer while $CO_2$ was bubbled through the mixture. The reaction product was then neutralized with a saturated solution of $Na_2CO_3$, heated up to 150° C. to drive off the water and filtered to remove the salt formed. The characteristics and performance of this product as a surface active agent are shown in Table II.

*Example 4*

33 g. of lauric acid chloride was added to 200 g. of "A" (prepared as in Example 1) over a period of 1¾ hours. During the addition the temperature rose to 41° C. After the addition was completed the reaction was stirred 30 minutes longer at 41° C. The product was then neutralized with a saturated solution of $Na_2CO_3$, heated to 150° C. and filtered. The characteristics and performance of this product as a surface active agent are shown in Table II.

*Example 5*

90 g. of "B" (a sucrose derivative in which 8 mols of butylene oxide were reacted with one mol of sucrose) was heated to 40–50° C. and 21 g. of refined tall oil fatty acid chlorides was added slowly with stirring. The pH of the reaction was checked periodically during the addition. When the reaction mixture became strongly acid due to the HCl evolved it was brought back to neutrality by a small addition of diethanol amine, thus keeping the reaction near neutrality throughout. A total of 4.2 g. of diethanol amine was added over the entire reaction. This product had much lighter color than those neutralized with $Na_2CO_3$ solution. The characteristics and performance of this product are shown in Table II.

*Example 6*

240 g. of "A" (prepared as in Example 1) was heated in a reaction flask to 45–50° C. 30 g. of refined tall oil fatty acid chloride was then added slowly with stirring to the reaction. The acid produced was continuously neutralized with diethanol amine throughout the reaction. A total of 7.4 g. of diethanol amine was employed for this purpose. The resultant ester product was light colored. The characteristics and performance of this product are shown in Table II.

*Example 7*

30 g. of acetone was mixed together with 100 g. of the product "G" (see Table I) until they formed a clear solution. 12.5 g. of refined tall oil fatty acid chloride was then added in small quantities over a period of 30 minutes with continuous stirring. As the reaction mixture became acid from the HCl given off, it was continuously neutralized with diethanol amine. During the entire process 3.2 g. of diethanol amine was used. The resulting product was a clear red solution. The characteristics and performance of this product are shown in Table II.

*Example 8*

54 g. of capric acid chloride was added slowly to 100 g. of "A" (prepared as in Example 1) at 45–50° C. while stirring. As acid began to form it was neutralized continuously with diethanol amine. 16 g. of diethanol amine was used during the entire process. The final product was a clear yellowish viscous product. The characteristics and performance of this product are shown in Table II.

*Example 9*

To 70 g. of "A" (prepared as in Example 1) 4.86 g. of caprylic acid chloride was added while stirring continuously at 45° C. The acid formed was neutralized continuously with diethanol amine. The final product was a viscous, clear golden brown liquid. The characteristics and performance of this product are shown in Table II.

Table I lists the amounts of materials used in the preparation of other sucrose-epoxide addition products and their properties and characteristics. These other addition products were made by the process used in preparing the product "A."

an aliphatic epoxide compound having from 3 to 18 carbon atoms in water and with a strong acid catalyst to

TABLE I.—SUCROSE–EPOXIDE ADDITION PRODUCTS

| Epoxide plus sucrose product | Epoxide used | | Amount water, g. | Amount sucrose, g. | Amount—kind catalyst, drops $H_2SO_4$ | Remarks |
|---|---|---|---|---|---|---|
| | Butylene oxide, g. | Propylene oxide, g. | | | | |
| A | 200 | | 100 | 171 | 5 | Light colored; viscous liquid; soluble in water, alcohol and benzene. No apparent surface activity. Approximately 80% solids, 20% water. Turn dark and decompose at 150°C. |
| A | (2) 400 | | 200 | 342 | 10 | Clear straw yellow. Same characteristics as above. |
| A | (4) 400 | | 200 | 342 | 10 | Same as above. |
| A | (5) 800 | | | 400 | 20 | Same as above except most water removed under vacuum to approximately 95% solids |
| D | 175 | | 100 | 171 | 5 | Light tan in color. Most water removal under vacuum. Approximate 95% solids. Soluble. |
| E | 150 | | 100 | 171 | 5 | Light brown in color. 96% solid soluble in water, alcohol. Slightly soluble in benzene. |
| B | 576 | | 100 | 342 | 10 | Light yellow in color. Soluble on heating to 159°C. 100% solids, all water. |
| B | (2) 1,728 | | 300 | 1,026 | 30 | Removed soluble in water, alcohol and benzene. Same as above. |
| C | | 320 | 100 | 342 | 10 | Light yellow color; less viscous than "A" type. Soluble in alcohol and water. Slightly soluble in benzene. 87% solids. |
| C | (2) | 640 | 200 | 684 | 20 | Same characteristics as above. Soluble in water; alcohol and slightly soluble in benzene. |
| G | | 464 | 200 | 324 | 20 | Same general characteristics as above; soluble in water; alcohol; insoluble in benzene, soluble in acetone. |

TABLE II

| Product of Example | Product epoxide plus sucrose | Grams epoxide plus sucrose | Fatty acid esters of sucrose derivatives type acid chloride | | | | | | Characteristics | | | |
|---|---|---|---|---|---|---|---|---|---|---|---|---|
| | | | Coconut, g. | Lauric acid, g. | Aliphat tall oil F.A., g. | Acintol #2 tall oil F.A., g. | Capric acid, g. | Caprylic acid, g. | Surface tension (dyns./cm. at 0.1%) | Foam | Solubility $H_2O$ to cloud, percent | Rinsing |
| 1 | A | 200 | | | 85 | | | | (1) | 53 | Low | 25 | Good. |
|   | A | 240 | | | 30 | | | | (1) | 36 | Med | 20 | Good. |
| 3 | A | 200 | | | 44 | | | | (1) | 32 | Med | 15 | Good. |
|   | (2) A | 100 | | | 29 | | | | (1) | 36 | Med | | Good. |
| 2 | A | 200 | 34 | | | | | | (1) | 46 | Low | 20 | Fair. |
|   | (2) A | 200 | 34 | | | | | | (1) | 46 | Low | 28 | Fair. |
|   | (2) A | 240 | | | 30 | | | | (1) | 36 | Med | 22 | |
|   | (2) A | 240 | | | 30 | | | | (1) | 40 | Med | 25 | Poor. |
|   | (3) A | 240 | | | 30 | | | | (1) | 32 | Med | 20 | |
|   | A | 100 | | | 12.5 | | | | (1) | 63 | Med | 33 | Fair. |
|   | D | 256 | | | 35.5 | | | | (1) | 46 | Med | 20 | Fair. |
| 4 | E | 200 | | 33 | | | | | (1) | 28.5 | Low | 70 | Fair. |
|   | A | 266 | | 33 | | | | | (1) | 30 | Low | 100 | Good. |
|   | B | 90 | | 10.7 | | | | | (2) | 28 | Low | 55 | |
| 5 | B | 90 | | | | | 21 | | (2) | 31 | Med | 25 | Poor. |
| 6 | (2) B | 240 | | | | | 30 | | (2) | 32 | Med | 23 | Good. |
|   | A | 240 | | 21.8 | | | | | (2) | 27 | Low | 50 | Poor. |
|   | A | 50.4 | | 15.7 | | | | | (2) | 28 | Med | 22 | |
| 8 | A | 100 | | | | | 54 | | (2) | 29 | Med | Insol. | Fair. |
|   | A | 100 | | | | | 27 | | (2) | 29 | | 25 | (4). |
|   | A | 100 | | | | | 14 | | (2) | 30 | Low | 52 | Excellent. |
|   | A | 70 | | | 30 | | | | (2) | 32.5 | Med | 6 | Good. |
|   | (2) B | 90 | | | 30 | | | | (2) | 32.0 | Med | 16 | Fair. |
|   | (3) B | 275 | | | 90 | | | | (2) | 33.5 | High | 14 | Fair. |
|   | B | 270 | | | 30 | | | | (2) | 35.6 | High | 36 | Excellent. [5] |
| 7 | G | 100 | | | 12.5 | | | | (2) | 31.6 | Med | 3 | Fair. |
| 9 | A | 70 | | | | 4.8 | | | (2) | 31.0 | Low[3] | 100 | Excellent. |

[1] Neutralized with $Na_2CO_3$.
[2] Neutralized with diethanolamine.
[3] Foams in cold hard water, but not in warm or hot.
[4] Product gave good performance when used as a liquid in dishwashing machines.
[5] Product gave good performance when used as a solid in dishwashing machines.

It has been determined that the product obtained by the reaction of 5.5 mols of butylene oxide with one mol of sucrose was most applicable for preparing the final product. The intermediate products designated as "A" in the examples and tables were made with such proportions of butylene oxide and sucrose. Similar proportions of other epoxide compounds on a molecular weight basis may also be used to form advantageous intermediate products.

I claim:

1. The process of producing a liquid fatty acid ester of a sucrose addition compound which comprises reacting sucrose with from 2 to 8 times an equimolar quantity of an aliphatic epoxide compound having from 3 to 18 carbon atoms in water and with a strong acid catalyst to form an addition compound, reacting the addition compound with an unsaturated fatty acid chloride having from 12 to 18 carbon atoms at a temperature of from 40° to 100° C., diluting the resulting ester with a solvent, neutralizing the resulting hydrochloric acid and separating the resulting liquid fatty acid ester of the sucrose addition compound.

2. In the process of claim 1, reacting the sucrose with an epoxy of the group consisting of butylene oxide, propylene oxide, octylene oxide, and dodecylene oxide to form the addition compound.

3. In the process of claim 1 reacting approximately 5.5 mols of the epoxide compound with one mol of sucrose in the presence of sulfuric acid catalyst to form the addition compound.

4. In the process of claim 1 reacting the addition product of sucrose and epoxide compound with a chloride of a fatty acid of the group consisting of lauric acid, oleic acid, animal and vegetable fats containing such acids, and refined tall oil.

5. In the process of claim 1, reacting the addition product of sucrose and epoxide compound with coconut fatty acid chloride in the presence of an acid catalyst.

References Cited in the file of this patent

UNITED STATES PATENTS

| 2,450,079 | Brown | Sept. 28, 1948 |
| 2,602,789 | Schwartz | July 8, 1952 |

OTHER REFERENCES

"Saturated Esters of Sucrose," by Morris Zief, U.S. Dept. of Agr., publication AIC–309, September 1951, pages 1 to 4.